United States Patent [19]

Mehoudar

[11] Patent Number: 5,207,386
[45] Date of Patent: May 4, 1993

[54] FLOW EMITTER UNITS MOULDS FOR USE IN THE MANUFACTURE THEREOF

[75] Inventor: Raphael Mehoudar, Tel-Aviv, Israel

[73] Assignee: Hydro-Plan Engineering Ltd., Tel-Aviv, Israel

[21] Appl. No.: 771,003

[22] Filed: Oct. 1, 1991

[51] Int. Cl.$^5$ .............................................. B05B 1/02
[52] U.S. Cl. .................................. 239/542; 239/547; 138/42
[58] Field of Search ................. 239/542, 547; 138/42, 138/44, 103, 111, 115

[56] References Cited

U.S. PATENT DOCUMENTS

| | | | |
|---|---|---|---|
| 3,870,236 | 3/1975 | Sahagun-Barragán | 239/542 |
| 3,896,999 | 7/1975 | Barragán | 239/542 X |
| 4,060,200 | 11/1977 | Mehoudar | 239/542 |
| 4,209,133 | 6/1980 | Mehoudar | 239/542 |
| 4,215,822 | 8/1980 | Mehoudar | 138/42 X |
| 4,430,020 | 2/1984 | Robbins | 239/542 X |
| 4,573,640 | 3/1986 | Mehoudar | 239/542 |
| 4,718,608 | 1/1988 | Mehoudar | 239/542 |

Primary Examiner—Andres Kashnikow
Assistant Examiner—William Grant
Attorney, Agent, or Firm—Helfgott & Karas

[57] ABSTRACT

An emitter unit having an elongated flowduct. The flowduct comprises a central elongated control duct of substantially rectangular cross-sectional shape having a width a and two sets of successive like flow pockets located respectively on either side of the control duct and opening into the control duct. Each flow pocket of the sets is defined between a pair of adjacent side walls of a pair of successive baffles of a corresponding set of baffles. Each baffle has baffle side walls which terminate in a baffle edge of width c and of height b, the baffles of one set being respectively directed substantially towards the mid-points of the inter-baffle regions of the opposite set. The baffle edges of each set of baffles are substantially aligned and define one pair of opposite longitudinal sides of the control duct, the other pair of longitudinal sides of the control duct being defined by first and second opposite control duct walls. The aligned edges of one set of baffles are substantially parallel to the aligned edges of the opposite set of baffles. The dimensions of a and c relative to d where d is the minimum throughflow spacing in the flowduct between successive, oppositely directed baffles are such that c lies substantially in the range 0–0.25 d and a lies substantially in the range 0.2d–0.4 d.

24 Claims, 8 Drawing Sheets

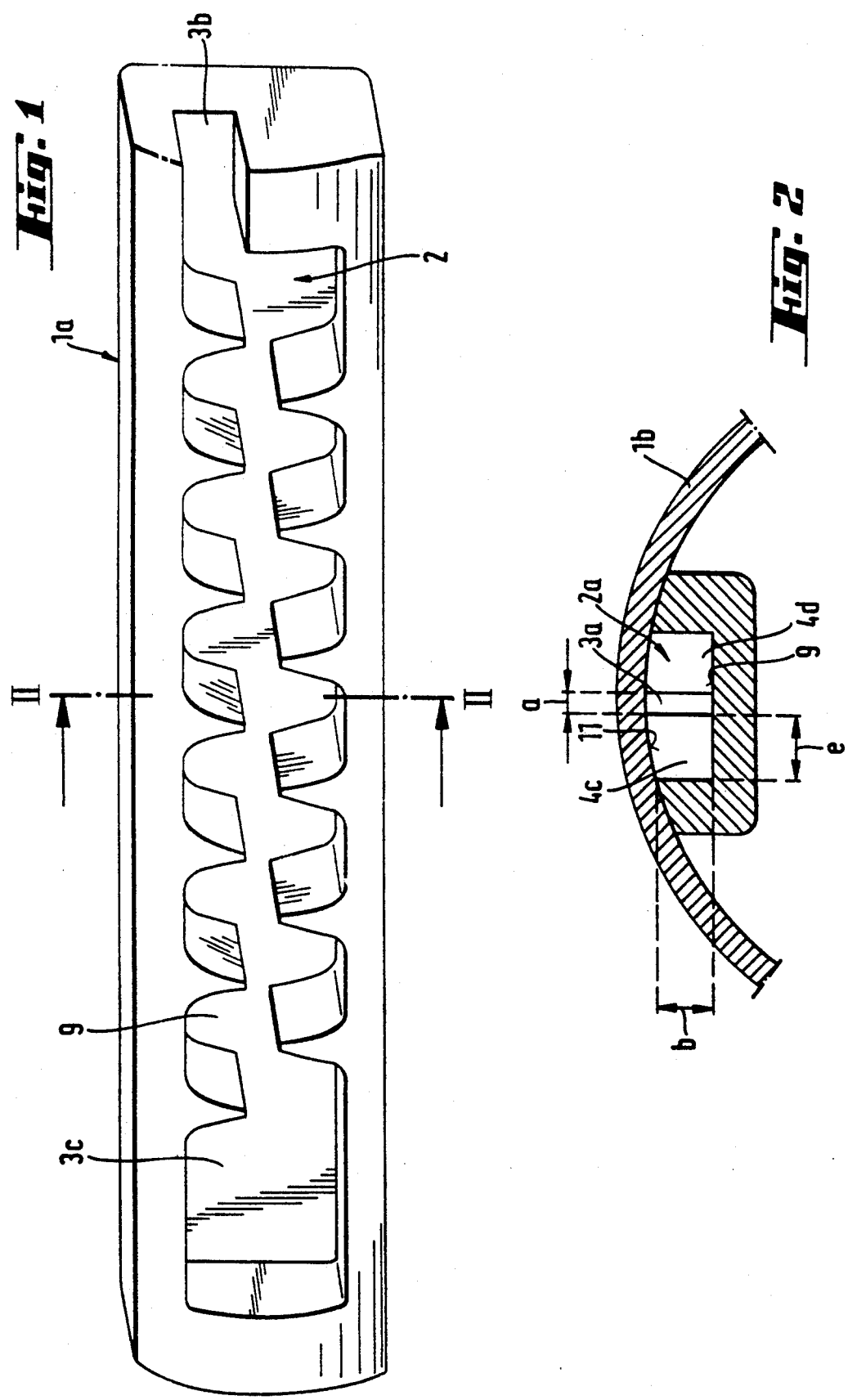

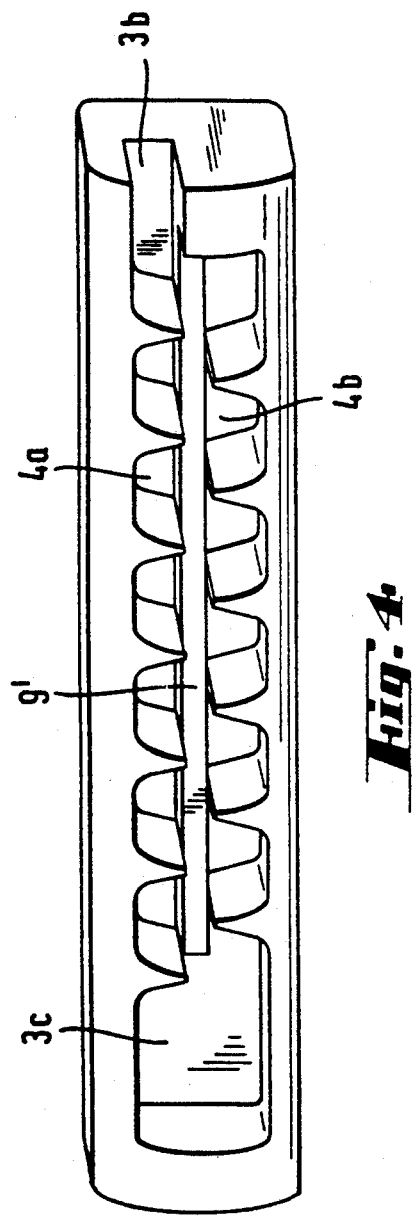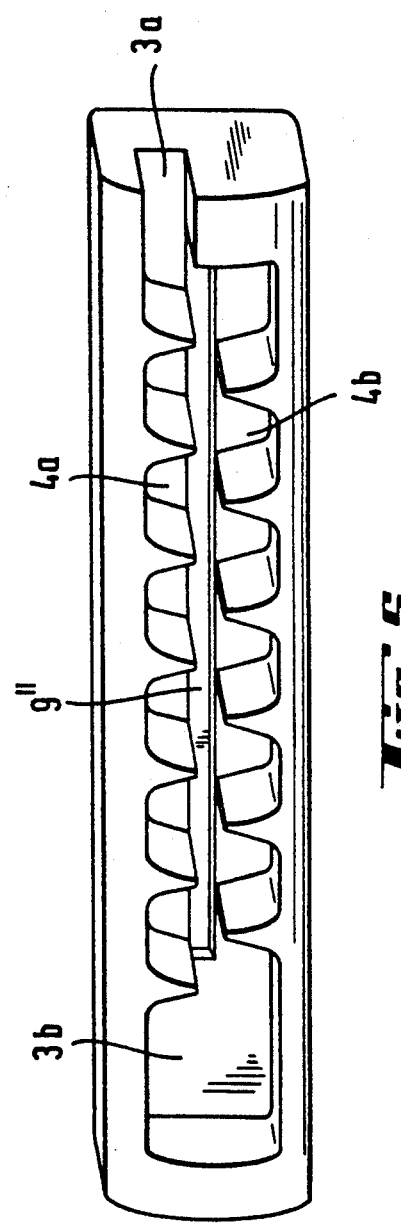

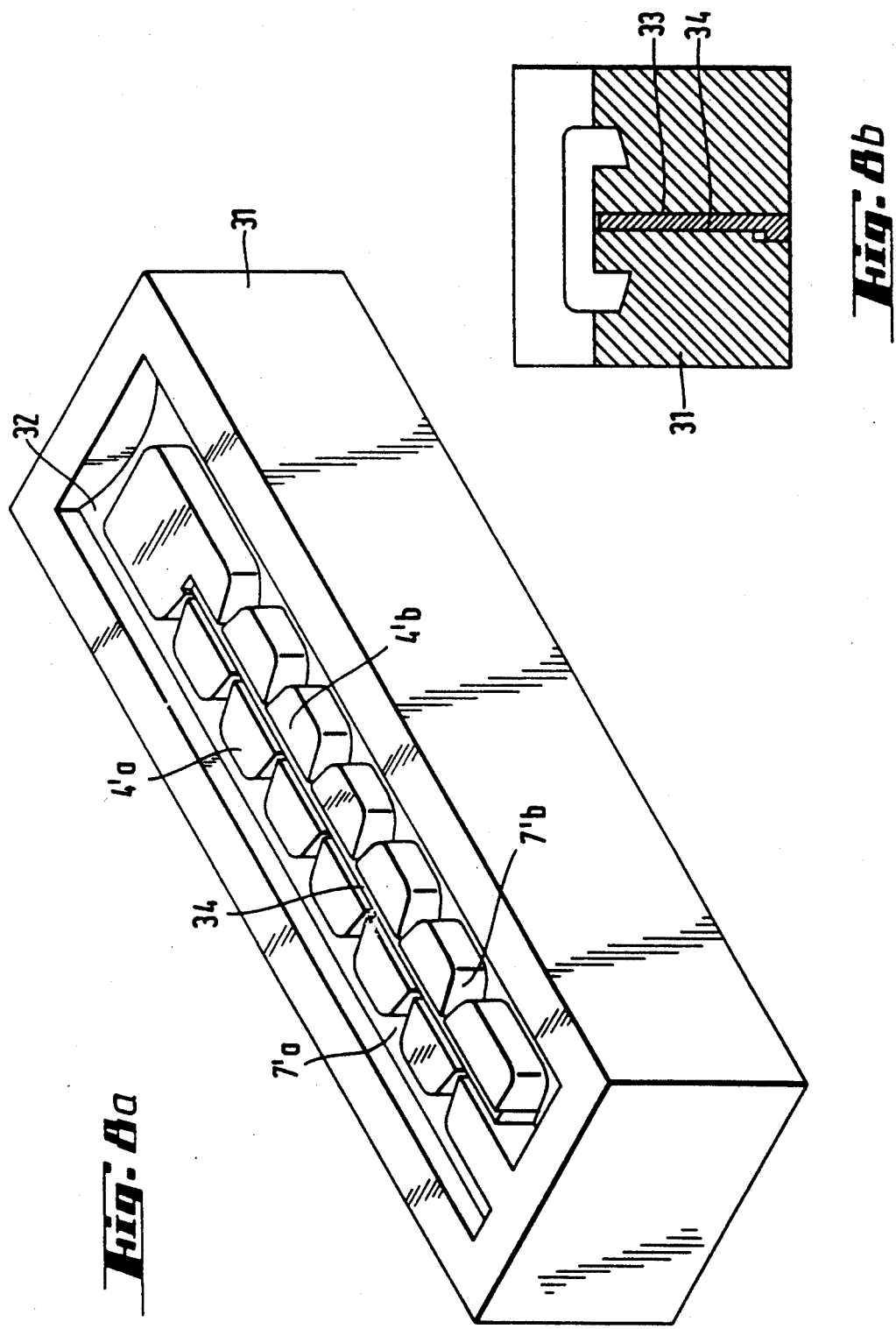

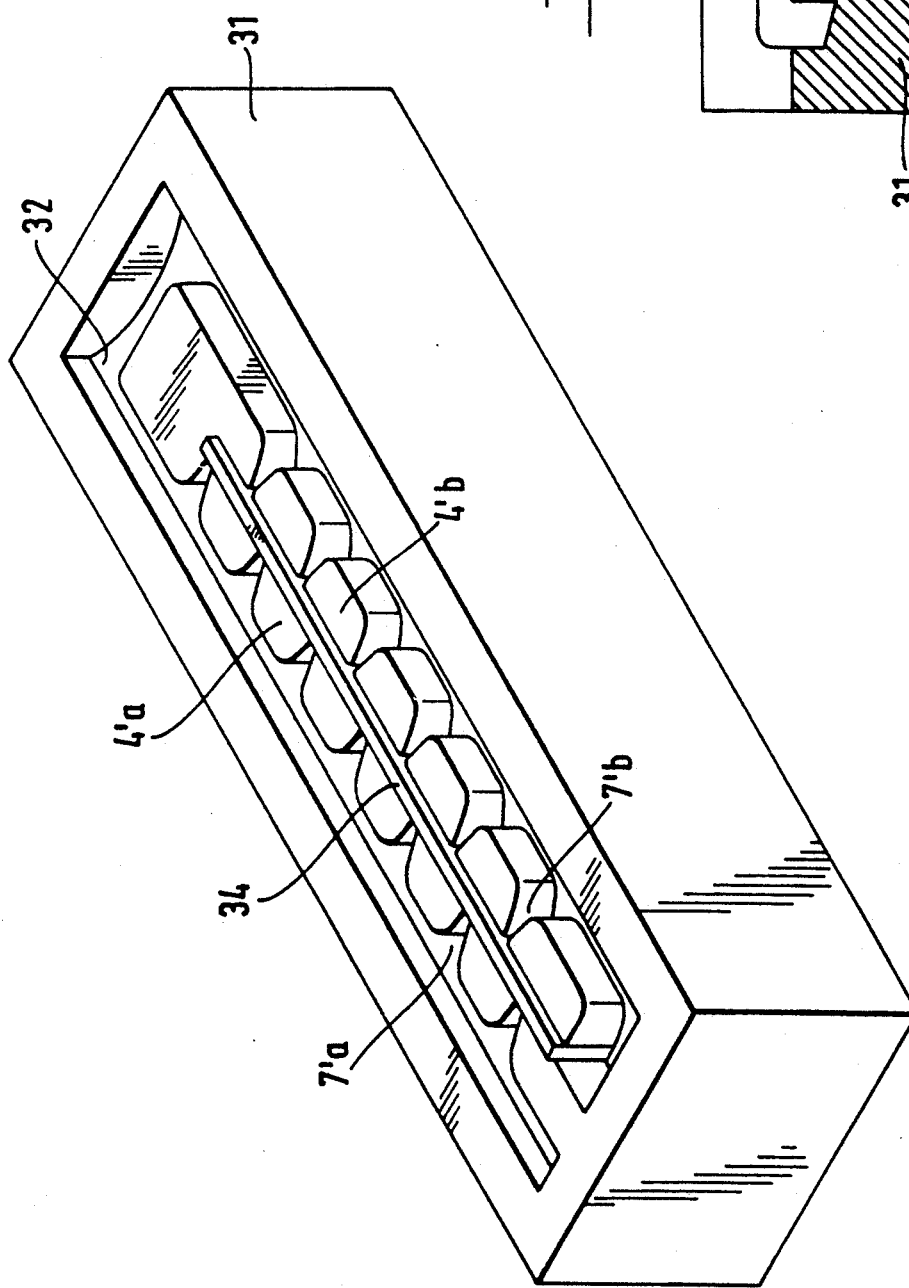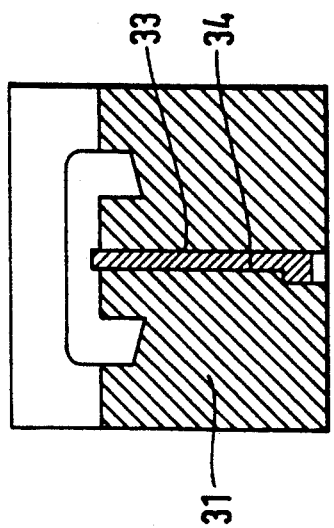
Fig. 9b
Fig. 9a

5,207,386

FLOW EMITTER UNITS MOULDS FOR USE IN THE MANUFACTURE THEREOF

FIELD OF THE INVENTION

The present invention relates to flow emitter units and moulds for use in the manufacture thereof.

BACKGROUND OF THE INVENTION

Flow emitter units have now been known and used for many years, particularly in irrigation, for ensuring the drip irrigation of crops. To this end, many proposals have been put forward, some of which have been employed in practice, for suitable mechanisms, known as emitter units, which ensure that a supply irrigation flow is delivered to the crops to be irrigated in the form of a drip having a specified drip output rate. It is known to be desirable with such emitter units that the unit should be capable of supplying the drip outflow at the required rate and, at the same time, should be minimally susceptible to blockage as a result of grit or other impurities to be found in the irrigation water. It is, of course, desirable that emitter units which are designed to satisfy these requirements should also be capable of ready and economical production and ease of use.

To this end, there have been many prior proposals which have attempted to fulfill these requirements to a lesser or greater degree. Among these prior proposals is the subject of our prior U.S. Pat. No. 4,060,200, in accordance with which the emitter unit was provided with a flowduct of specific shape and having relative dimensions lying within a specific range. The proposals made in our prior patent were, in fact, incorporated in emitter units which have been manufactured and sold throughout the world with a considerable degree of success.

The present invention allows for the production of emitter units having radically improved performance characteristics.

SUMMARY OF THE INVENTION

According to the invention, there is provided an emitter unit having wall means for defining an elongated flowduct having a flowduct inlet and a flowduct outlet and a unit inlet and a unit outlet respectively coupled to the flowduct inlet and the flowduct outlet; said flowduct comprising a central elongated control duct of substantially rectangular cross-sectional shape having a width and two sets of successive like flow pockets located respectively on either side of the control duct and opening into the control duct; each flow pocket of said sets being defined between a pair of adjacent side walls of a pair of successive baffles of a corresponding set of baffles, between first and second opposite flowduct walls and a flowduct side wall; each baffle having baffle side walls terminating in a baffle edge of width c and of height b, the baffles of one set being respectively directed substantially towards the midpoints of the inter-baffle regions of the opposite set; the baffle edges of each set of baffles being substantially aligned and defining one pair of opposite longitudinal sides of the control duct, the other pair of longitudinal sides of said control duct being defined by first and second opposite control duct walls, the aligned edges of one set of baffles being substantially parallel to the aligned edges of the opposite set of baffles; the dimensions of a and c relative to d where d is the minimum throughflow spacing in said flowduct between successive, oppositely directed baffles being such that c lies substantially in the range $0$–$0.25$ d and a lies substantially in the range $0.2$ d–$0.4$ d.

It will be understood that, as used int he present specification, the term "alignment of the edges of the baffle teeth" includes not only alignment along straight lines but also alignment along smooth curves such as, for example, circles. Similarly, references to the control duct as being of "substantially rectangular cross-sectional shape" include such control ducts where one or both of the opposite control duct walls are slightly curved or inclined.

Preferably, the depth e of the baffles, i.e. the extent to which the baffles project into the flowduct, should not be greater than $1.5$ d.

It has been found that by providing an emitter unit with a flowduct which includes a central control duct having relative dimensions as defined above, the efficiency of the emitter unit, when this is considered in terms of its ability to reduce the water flow pressure for a given flowduct length and minimum throughflow spacing is considerably increased as compared with known emitter units. As a consequence, it is possible to achieve a required outflow rate with a flowpath length and a number of baffles which are less than those with such known units. In this way it is possible to reduce the size and consequently the production costs of the emitter units.

Furthermore, with emitter units in accordance with the present invention and provided with such a central control duct, the sensitivity of the outflow rate from the emitter unit to variations in inflow pressure of the irrigation water, is comparatively low. This reduction in sensitivity to pressure variation leads to very considerable advantages both when the emitter units are not provided with specific means for guarding against pressure variations, and even when the emitter units are provided with such means, seeing that in the latter case the means for guarding against pressure variations can be of simpler, and more economical construction, than hitherto.

It is believed that, with emitter units in accordance with the invention, the vulnerability of the emitter unit to blockage by grit, sediment or the like will be reduced as compared with known drippers. This reduction would appear to be a consequence, on the one hand, of the possibility, in accordance with the invention, to produce emitter units having shorter flowduct lengths and/or reduced numbers of baffles and also, on the other hand, of the intrinsic nature of the flow conditions prevailing in the flowduct.

In accordance with a further aspect of the present invention, there is provided for use in an emitter unit comprising an emitter unit body and a cover member therefor, an emitter unit body having wall means for defining an elongated flowpath having a flowpath inlet and a flowpath outlet, said flowpath comprising a central elongated control path of substantially rectangular cross-sectional shape having a width a and two sets of successive, like flow recesses located respectively on either side of the control path and opening into the control path; each flow recess of said sets being defined by a pair of adjacent side walls of a pair of successive baffles of a corresponding set of baffles, a base flowpath wall and a flowpath side wall; each baffle having baffle side walls of height b and terminating in a baffle edge of width c and of height b, the baffles of one set being respectively directed substantially towards the midpoints of the inter-baffle regions of the opposite set; the baffle edges of each set of baffles being substantially aligned and defining one pair of opposite longitudinal sides of the control path, the aligned edges of one set of baffles being substantially parallel to the aligned edges of the opposite set of baffles; the arrangement being such that c lies substantially in the range 0–0.25 d and a lies substantially in the range 0.2 d–0.4 d, where d is the minimum throughflow spacing in said flowpath between successive, oppositely directed baffles.

In accordance with a further aspect of the present invention, there is provided a mould for use in producing, by injection moulding, an emitter unit body according to the present invention, which mould comprises a mould body, a central spacer element having a uniform width corresponding to the width of a of the control path extending out of a central portion of the body, and a mould cavity formed on either side of the spacer element and shaped to constitute a negative form of the flow recesses and baffles, the negative form of said baffles being bounded by said spacer element, whereby the latter defined the edges of said baffles.

Preferably the spacer element is constituted by a displaceable insert displaceably located in a central throughgoing channel having a uniform width corresponding to the width of said spacer element extending through said central portion of said body, the negative form of said baffles opening into said channel.

DESCRIPTION OF THE DRAWINGS

For a better understanding of the present invention, and to show how the same may be carried out in practice, reference will now be made to the accompanying drawings, in which FIG. 1 is a perspective view of a first form of emitter body member for an emitter unit;

FIG. 2 is a cross-sectional view of an emitter unit incorporating the body member shown in FIG. 1, taken along the line II—II;

FIGS. 4 and 5 are respective perspective views and FIG. 6 is a plan view of further forms of emitter body members in accordance with the present invention;

FIGS. 7a, 8a, 9a and 10 are respective perspective views of one of the elements of two-element moulds used in moulding the emitter body members shown in FIGS. 1, 2, 3, 4, 5 and 6; and FIGS. 7b, 8b and 9b are respective schematic cross-sectional views of the two-piece moulds shown in FIGS. 7a, 8a and 9a.

DETAILED DESCRIPTION OF SPECIFIC EMBODIMENTS

Figure 3:
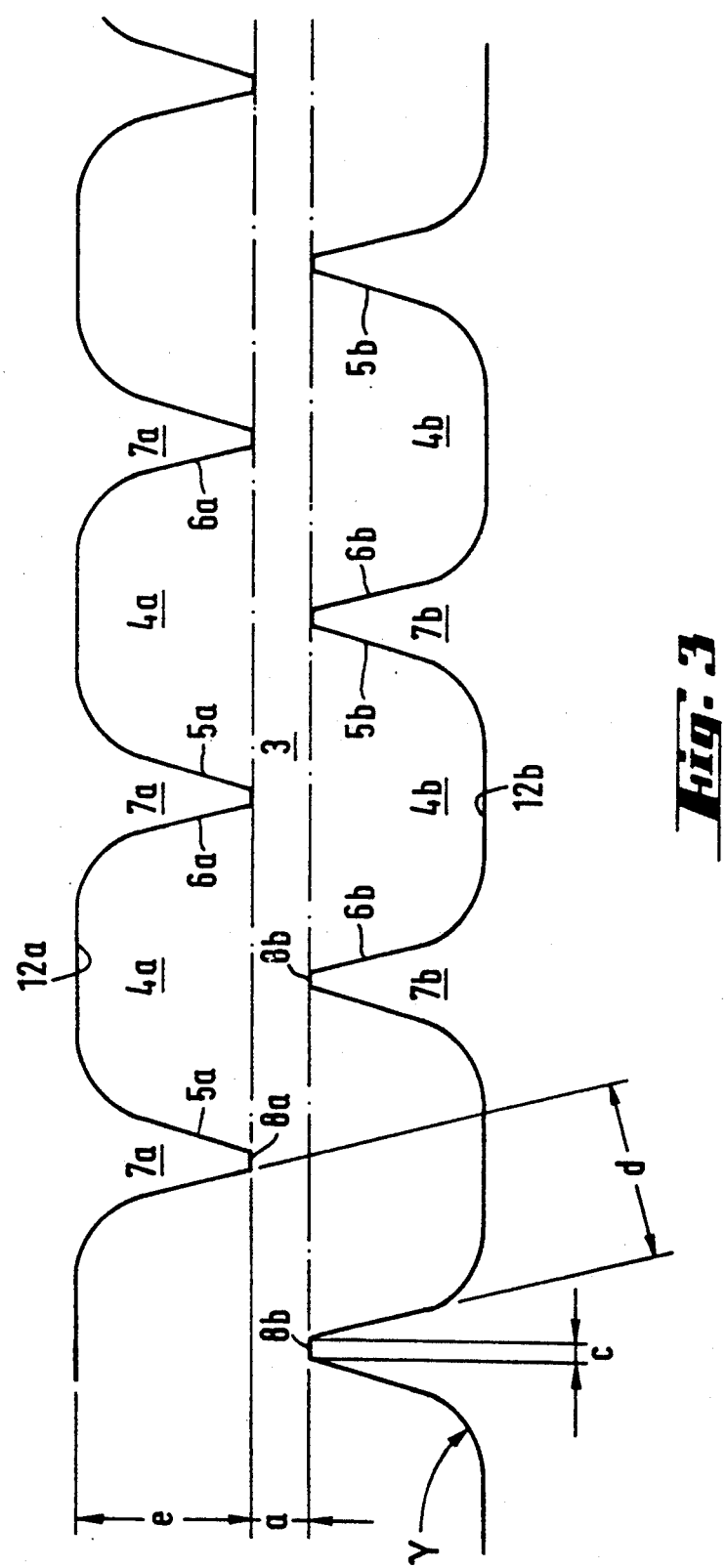
FIG. 3 is a schematic plan view of a flowduct in the emitter body member shown in FIG. 1.

Reference will first be made to FIGS. 1, 2 and 3 of the drawings for a detailed description of one embodiment of an emitter body member and an emitter unit incorporating such a body member in accordance with the present invention, and the basic principles underlying the construction of this and other emitter units in accordance with the invention.

As seen in FIGS. 1 and 2, the emitter unit comprises an elongated body member 1a formed of a suitable plastics material, in which has been formed by moulding an elongated flowpath 2. As seen in FIG. 2, the body member 1a is sealingly bonded to an internal surface of a conduit, the latter therefore constituting an effective cover member 1b for the body member 1a so that the cover and body members together form the emitter unit, the cover member defining with the flowpath 2 a flowduct 2a. The flowpath 2 comprises a central, elongated control path 3 (seen clearly in FIGS. 2 and 3 of the drawings) of substantially rectangular cross-sectional shape, having a width a and a height b. Width a may be substantially equal to height b. The cover member 1b defines with the control path 3 a control duct 3a. On either side of the control path 3 are two sets of successive, like, flow recesses 4a and 4b, each of the flow recesses opening into the control path 3. Each of the flow recesses 4 a is defined between a pair of adjacent side walls 5a, 6a of a pair of successive baffles 7a of a first set of baffles 7a.

Similarly, each flow recess 4b defined between a pair of adjacent side walls 5b and 6b of a successive pair of baffles 7b of a set of baffles 7b.

The cover member defines with the flow recesses 4a and 4b corresponding flow pockets 4c and 4d.

The baffles terminate in baffle edges 8a and 8b of substantially rectangular shape of height b and of width c (see FIG. 3). The edges 8a and 8b of the baffles 7a and 7b are respectively aligned along opposite longitudinal sides of the control duct 3a, the control duct being furthermore defined between a base wall 9 (which base wall also constitutes a coplanar extension of the base wall of the pockets 4c and 4d, and the internal surface of the cover member 1b.

The flowduct 2a communicates at one end thereof with an emitter inlet 3b and, at an opposite end thereof, with an outlet chamber 3c which communicates with an emitter outlet aperture (not shown) formed in the cover member 1b.

As seen in FIG. 3 of the drawings, the minimal throughflow path between successive baffles of opposite sets has a dimension d whilst the depth of the baffles 7a 7b (i.e. the extent to which the baffles project into the flowpath 2) has a dimension e.

In the embodiment shown in the drawings, each baffle side wall of one set of baffles is substantially parallel to the adjacent baffle side wall of the oppositely directed set of baffles. Thus, the baffle side wall 5a of the baffle 7a is parallel to the baffle side wall 5b of the baffle 7b, whilst the baffle side wall 6a of the baffle 7a parallel to the baffle side wall 6b of the baffle 7b.

It has been found that with the construction of the emitter unit in accordance with the invention and with the dimensions a and c relative to the dimension d lying within the range specified in accordance with the invention, the efficiency of an emitter unit as just described and in accordance with the invention, when considered in terms of its ability to reduce the waterflow pressure for a given flowduct length and minimum throughflow spacing, is significantly increased as compared with hitherto known emitter units.

Thus, with an emitter unit where the ratio of c to d lies substantially between zero and 0.25, the provision of a control duct 3a in accordance with the invention having a dimension a wherein the ratio of a:d lies substantially between 0.2 to 0.4 (preferably 0.3), results in the efficiency of the emitter unit, in terms referred to above, being very significantly increased.

The baffle side walls 5a, 6a and 5b, 6b define angles which are less than 45°, preferably less than 30°.

Furthermore, the dimension e should not be greater than 1.5 d.

As indicated above, in addition to the improvement in the efficiency of the emitter unit as compared with known emitter units when measured in terms of reduction of waterflow pressure per unit flowpath length and per baffle, it is expected that the emitter units in accordance with the invention will be very much less prone to blockage than with known emitter units. This expectation is based on the following considerations:

a) It is believed that a considerable degree of turbulence is developed in the flow pockets, and this in itself militates against the depositing of blocking sediment in the flowpath.

b) The fact that a free control duct or passage way is always maintained in the emitter unit has the result that even though blockage may occur between successive baffles of a set, the control duct should nevertheless remain free from such blockage.

c) To the extent that the control duct is an effective passage way ensuring free flow of water, it is possible so to dimension the cross-sectional shape of the control duct so that it approaches a substantially square shape, seeing that it is believed that with such a square shape the danger of blockage is significantly reduced. It is possible, with the construction in accordance with the invention, so to dimension the control duct so that its cross-section approaches a square cross-sectional shape.

The substantial increase in the emitter efficiency in terms of reduction in flow pressure per unit length of flowpath gives rise to the following distinct practical advantages:

a. For a given minimal throughflow spacing d it is possible to reduce the number of baffles and to reduce the length of the flowduct and this, in its turn, reduces the size of the emitter unit and the mould required to manufacture the unit, with the obvious reduction in production costs. Furthermore, it would appear to follow that the reduction in flowduct length and number of baffles must intrinsically reduce the danger of blockage.

b. For a given minimal throughflow spacing d, the introduction of the control duct with its width a carries with it the consequence that the flowduct modular length (i.e. the longitudinal spacing between adjacent baffles of the same set) is reduced (as compared with conventional flowducts), and therefore a greater number of baffles can be accommodated in the same flowpath length. Thus, as the control duct width a increases (within the limits set in accordance with the invention), it is possible to obtain emitter units which, for a given spacing d, are of shorter flowduct length. This obviously leads to an economy in size and therefore in production costs.

c. It has furthermore been found that with an emitter unit in accordance with the invention having a control duct of width a lying within the prescribed range, the sensitivity of the emitter unit to variations in water input pressure is significantly reduced as compared with what occurs with emitter units where such a control duct is not provided. As a consequence of this significant reduction in sensitivity to pressure variations, the following distinct advantages are obtained:

(i) the dripper lines employing such emitter units are not sensitive to the same degree to pressure losses along their length and this facilitates the lengthening of these emitter lines or the reduction of the diameters thereof. Similarly, the dripper lines are less sensitive to the effect of topographical variations;

(ii) when the dripper lines employ emitter units in accordance with the invention and which are provided with pressure regulating means, the variations in output which nevertheless would normally occur as a result of variations in tolerance of the pressure-sensitive elements in the emitters, are significantly reduced; and (iii) alternatively and within a given emitter output range it is possible to allow for a greater range in tolerance for the pressure-sensitive elements, and in this way significantly to reduce the costs of production.

By increasing the control path width a until $a_{max}$, the outflow rate reduces as $a_{max}$ is approached whilst beyond $a_{max}$ the outflow rate begins to rise. There is therefore an added advantage in operating at the particular spacing where the outflow rate is minimal. Thus, at this position one can operate with a maximum throughflow spacing d. Furthermore, at this position the emitter efficiency is least sensitive to possible inaccuracies in determining the control path width a in the mould.

Whilst in the specific embodiments illustrated in and described with reference to FIGS. 1 and 2 of the drawings, the base wall 9 of the control duct 3a is shown as being a co-planar and continuous extension of the base wall of the flow pockets 4c and 4d, in the embodiment shown in FIG. 4 of the drawings the base wall is shown as being slightly raised with respect to the base walls of the flow recesses 4a and 4b to form space 9'.

In the embodiment shown in FIG. 5 of the drawings, the base wall 9" of the control path is shown as being slightly inset with respect to the base walls of the flow pockets 4a and 4b.

Whilst in the embodiments illustrated and described with reference to FIGS. 1 through 5 of the drawings the flowpath is essentially rectiliner in shape, it will be appreciated that the invention is not restricted to such rectiliner flowpaths, but is directly applicable to smoothly curved flowpaths, the concept of alignment of the edge surfaces of the baffles with respect to the longitudinal edges of the control path including alignment with respect to a smooth curve as well as alignment along a straight line.

Figure 6:
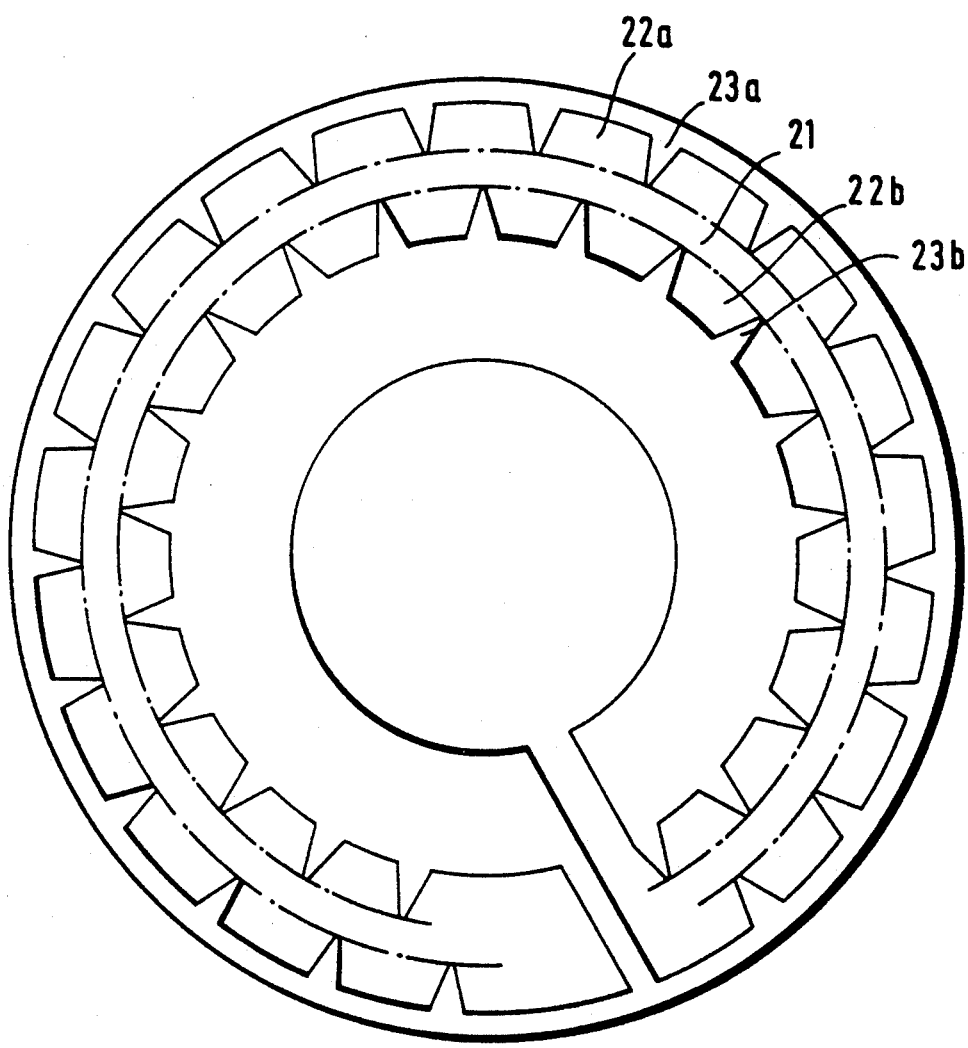

A practical embodiment of an emitter body member of such an emitter unit with a smoothly curved (in the present case, circular) flowpath is shown in FIG. 6 of the drawings, wherein a circular flowpath comprises a central circular control path 21 bounded on either side by respective sets of flow recesses 22a, 22b formed between adjacent side surface of successive pairs of baffles 23a, 23b, where the edge surfaces of the baffles are respectively aligned about the circular edges of the control path 21.

The dimensional restrictions on the relationships between the width a of the control duct, the width c of the edge surfaces of the baffles and the minimal throughflow spacing d in the flowduct are as described above with reference to FIG. 3 of the drawings and will not be gone into in any further detail. It is to be noted, however, that whilst in the embodiments described with reference to FIGS. 1 through 5 of the drawings the baffles 7a, 7b define with their respective side walls 12a, 12b a curvature having a radius r in the embodiment shown in FIG. 6 of the drawings this radius of curvature is minimal.

It will furthermore be appreciated that whilst, in the example given above with reference to FIGS. 1 and 2, the flowduct 3a is shown as having substantially planar base walls 9 which are disposed opposite a slightly curved wall 11 formed in the cover member 16, the invention is equally applicable to emitter units having flowducts wherein the base wall is curved and the opposite wall of the cover member is either curved or planar or where the base and opposite walls are slightly inclined with respect to each other.

An emitter unit, in accordance with the invention, can be provided with a pressure sensitive element so as to limit variations in the outflow rate with variations in an input pressure. Thus, for example, the emitter unit can be provided with differential pressure control means such as that described, for example, in our U.S. Pat. No. 4,209,133. With such a unit there is formed in the wall thereof a recessed cavity of extended dimensions as compared to the with of the outflow duct. The latter communicates with the cavity. There is formed in the base of the cavity an outlet aperture spaced from the rim of the cavity and having a rim area substantially less than that of the recessed cavity. There can optionally be formed in the base of the cavity a short slit which opens into the outlet aperture. There is furthermore provided a resiliently flexible membrane, one face of which is juxtaposed with respect to the rim of the cavity and an opposite face of which communicates with said unit inlet or is otherwise exposed to the inlet pressure. The arrangement is such that upon fluid pressure at the unit inlet exceeding flow pressure in the cavity by a predetermined amount, the membrane flexes elastically towards the outlet aperture so as to define with the rim of the aperture a restricted outflow path, thereby limiting variations in the outflow rate.

References will now be made to FIGS. 7 through 10 of the drawings, wherein there are illustrated moulds for use in producing, by injection moulding, the emitter units shown in and described with reference to FIGS. 1 through 6 of the drawings.

Figures 7A, 7B:
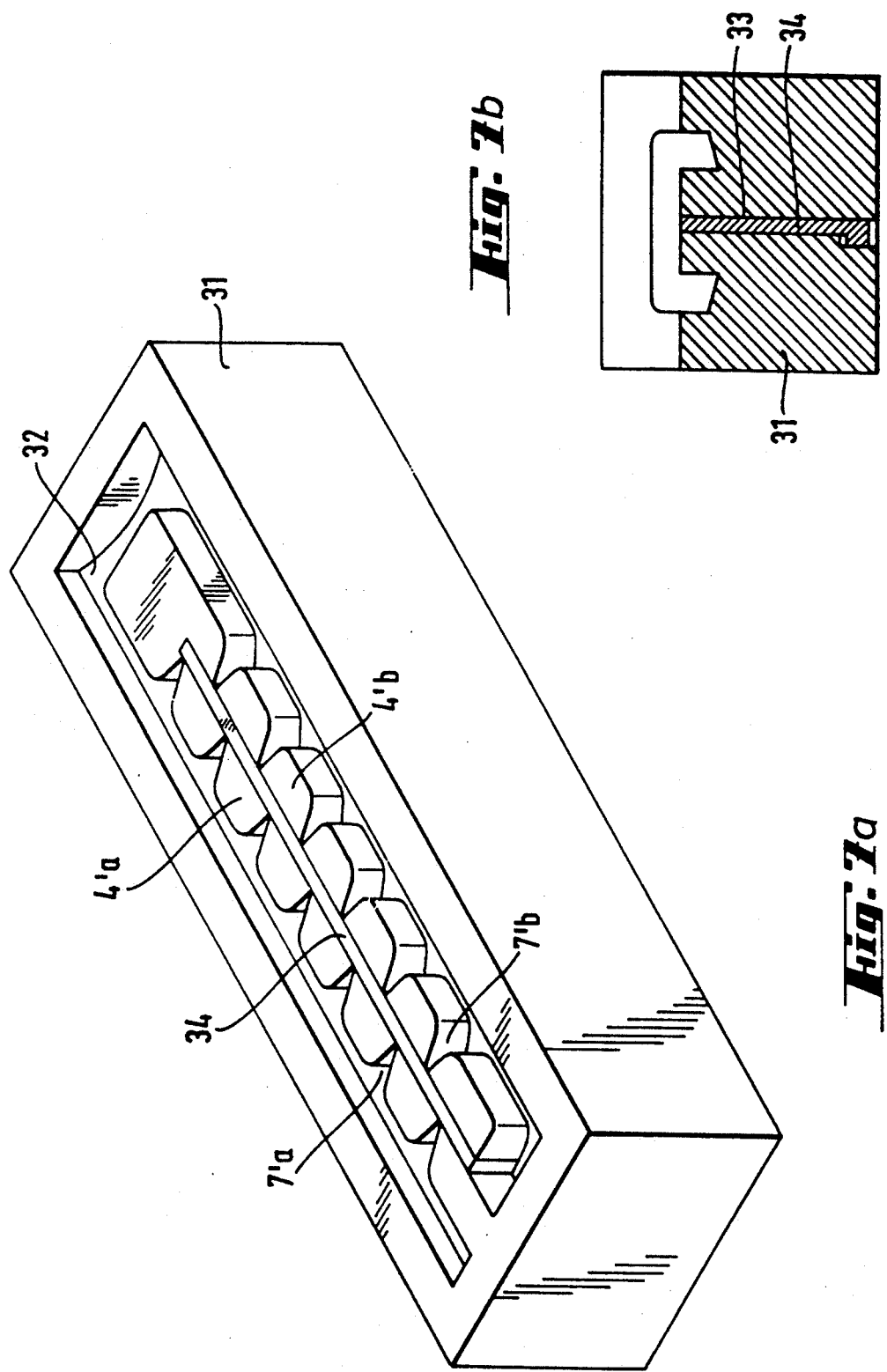

FIGS. 7a and 7b illustrate the mould employed for producing the body member of the emitter unit shown in FIGS. 1 and 2 of the drawings. As can be seen, the mould comprises a mould body 31 having, on an upper face thereof, a mould cavity 32, the cavity including a central, longitudinal throughgoing channel 33 of substantially rectangular cross-sectional shape having a uniform width corresponding to the width a of the control path in which is slidably displaceable a correspondingly shaped and dimensioned spacer insert 34. The mould cavity 32 is formed on either side of the channel 33 and is so shaped so as to constitute a negative form 4′a and 4′b of the sets of flow recesses 4a and 4b shown in FIGS. 1 and 2 of the drawings, and of the baffles 7′a and 7′b. As can be seen, the cavities 7′a and 7′b constituting the negative of the baffle teeth 7a and 7b open into the central throughgoing channel 33 and therefore, in consequence the displaceable spacer insert 34 serves to limit and ensure absolute alignment of the baffle edges. As can be seen in FIGS. 7a and 7b of the drawings, the upper end of the spacer insert 34 is substantially flush with the negative forms of the flow recesses 4′a and 4′b and therefore, in consequence the base wall of the control path will be substantially flush with the base walls of the flow recesses as seen and described with reference to FIGS. 1 and 2 of the drawings.

With the mould shown in FIGS. 8a and 8b of the drawings, the upper and of the insert 34 is inset with respect to the surfaces of the negative forms of the flow recesses and, as a consequence, the emitter unit is formed with a control path whose base surface is raised with respect to the corresponding base surfaces of the flow recesses as shown in FIG. 4 of the drawings.

In the embodiment shown in FIGS. 9a and 9b of the drawings, the upper end of the insert 34 is raised with respect to the corresponding surfaces of the negative forms of the flow recesses and therefore, in consequence in the emitter unit produced with this mould, the base wall of the flowpath is inset with respect to the corresponding base walls of the flow pockets.

Figure 10:
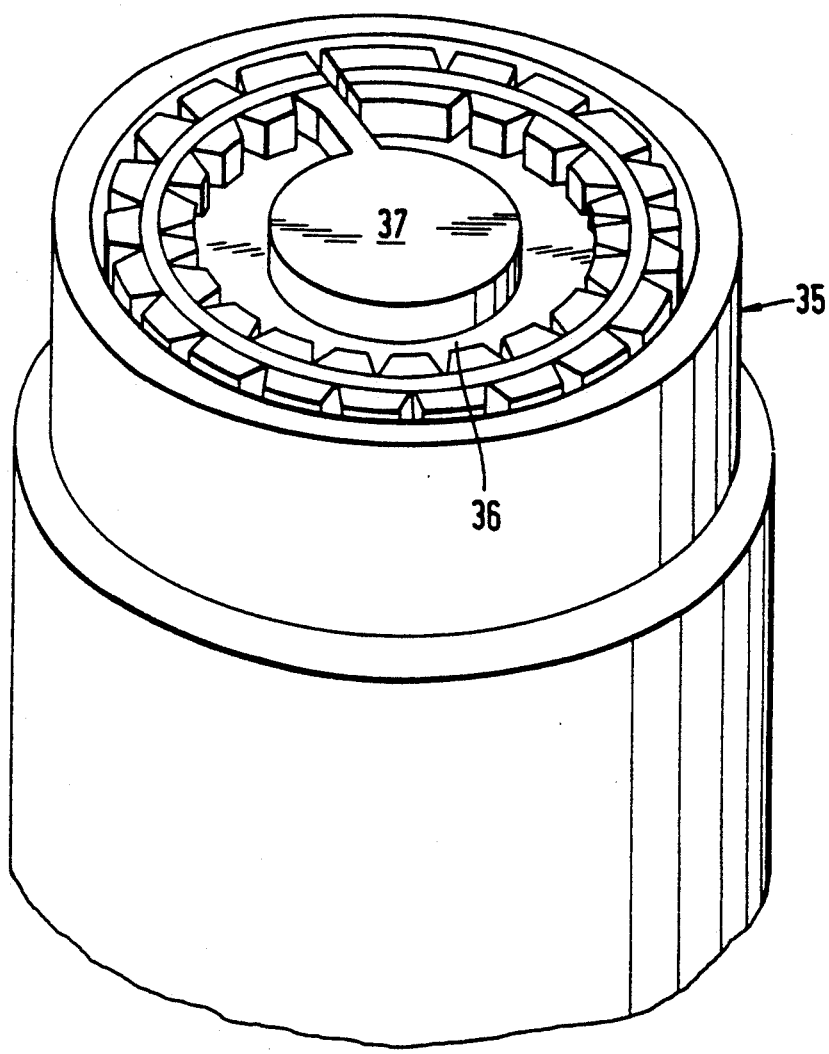

In the embodiment shown in FIG. 10 of the drawings, a circular mould 35 is shown having a mould body formed with a central circular channel 36 of substantially rectangular cross-sectional shape in which is displaceably insertable a tubular spacer insert 37 of corresponding rectangular cross-sectional shape. This mould is for use in forming the emitter unit shown in FIG. 6 of the drawings.

In the embodiments of the moulds shown in FIGS. 8 through 10 of the drawings, the mould is formed with a central, throughgoing channel in which is fitted a displaceable spacer insert which facilitates not only the accurate disposition and spacing of the baffle edges but also variations of the depth b of the control duct. The moulds in accordance with the invention can be formed with a spacer element which is fixed with respect to the mould body and which only serves for the accurate disposition and spacing of the baffle edges.

I claim:

1. An emitter unit having wall means for defining an elongated flowduct having a flowduct inlet and a flowduct outlet and a unit inlet and a unit outlet respectively coupled to the flowduct inlet and the flowduct outlet; said flowduct comprising a central elongated control duct of substantially rectangular cross-sectional shape having a width a and two sets of successive like flow pockets located respectively on either side of the control duct and opening into the control duct; each flow pocket of said sets being defined between a pair of adjacent side walls of a pair of successive baffles of a corresponding set of baffles, between first and second opposite flowduct walls and a flowduct side wall; the baffle side walls terminating in a baffle edge of width c and of height b, the baffles of one set being respectively directed substantially towards the mid-points of the inter-baffle regions of the opposite set; the baffle edges of each set of baffles being substantially aligned and defining one pair of opposite longitudinal sides of the control duct, the other pair of longitudinal sides of said control duct being defined by first and second opposite control duct walls, the aligned edges of one set of baffles being substantially parallel to the aligned edges of the opposite set of baffles; the dimensions of a and c relative to d where d is the minimum throughflow spacing in said flowduct between successive oppositely directed baffles being such that c lies substantially in the range 0–0.25 d and a lies substantially in the range 0.2 d–0.4 d.

2. An emitter unit according to claim 1, wherein said first control duct walls constitute continuous extensions of said first flowduct walls.

3. An emitter unit according to claim 1, wherein said first control duct walls are offset with respect to said first flowduct walls.

4. An emitter unit according to claim 1, wherein each baffle side wall of one set of baffles is substantially parallel to the adjacent baffle side wall of the oppositely directed set of baffles.

5. An emitter unit according to claim 1, wherein c lies substantially in the range 0.02 d–0.15 d.

6. An emitter unit according to claim 1, wherein a lies substantially in the range 0.2 d–0.3 d.

7. An emitter unit according to claim 6, wherein a is substantially equal to 0.3 d.

8. An emitter unit according to claim 6, wherein a is substantially equal to b.

9. An emitter unit according to claim 1, wherein the side walls of each baffle define an angle less than 45°.

10. An emitter unit according to claim 9, wherein said angle is less than 30°.

11. An emitter unit according to claim 1, wherein the depth e of the baffles is not greater than 1.5 d.

12. An emitter unit according to claim 1 wherein said wall means comprises an emitter body member having formed therein an elongated flowpath and an emitter cover member sealingly juxtaposed with respect to said body member so as to define with said flowpath said flowduct.

13. An emitter unit according to claim 12, wherein said cover member is constituted by a plastic conduit, said body member being sealingly bonded to an internal surface of said conduit, said unit inlet communicating with the interior of said conduit, said unit outlet being formed in said conduit.

14. For use in an emitter unit comprising an emitter unit body and a cover member therefor, an emitter unit body having wall means for defining an elongated flowpath having a flowpath inlet and a flowpath outlet, said flowpath comprising a central elongated control path of substantially rectangular cross-sectional shape having a width a and two sets of successive, like flow recesses located respectively on either side of the control path and opening into the control path; each flow recess of said sets being defined by a pair of adjacent side walls of a pair of successive baffles of a corresponding set of baffles, a base flowpath wall and a flowpath side wall; the baffle side walls being of height b and terminating in a baffle edge of width c and of height b, the baffles of one set being respectively directed substantially towards the mid-points of the inter-baffle regions of the opposite set; the baffle edges of each set of baffles being substantially aligned and defining one pair of opposite longitudinal sides of the control path, the aligned edges of one set of baffles being substantially parallel to the aligned edges of the opposite set of baffles; the arrangement being such that c lies substantially in the range 0–0.25 d and a lies substantially in the range 0.2 d–0.4 d, where d is the minimum throughflow spacing in said flowpath between successive, oppositely directed baffles.

15. An emitter unit body according to claim 14, wherein a base control path wall constitutes a continuous extension of said base flowpath wall.

16. An emitter unit according to claim 14, wherein a base control path wall is offset with respect to the corresponding base flowpath wall.

17. An emitter unit body according to claim 14, wherein each baffle side wall of one set of baffles is substantially parallel to the adjacent baffle side wall of the oppositely directed set of baffles.

18. An emitter unit body according to claim 14, wherein c lies substantially in the range 0.02 d–0.3 d.

19. An emitter unit body according to claim 14, wherein a lies substantially in the range 0.2 d–0.3 d.

20. An emitter unit body according to claim 14, wherein a is substantially equal to 0.3 d.

21. An emitter unit body according to claim 14, wherein a is substantially equal to b.

22. An emitter unit body according to claim 14, wherein the side walls of each baffle define an angle less than 45°.

23. An emitter unit body according to claim 22, wherein said angle is less than 30°.

24. An emitter unit body according to claim 14, wherein the depth e of the baffles is not greater than 1.5 d.

* * * * *